(12) United States Patent
Su et al.

(10) Patent No.: US 7,163,284 B2
(45) Date of Patent: Jan. 16, 2007

(54) MULTI-REAGENT INKJET CARTRIDGE (75) Inventors: Shyh-Haur Su, Hsinchu (TW);
Ching-Yi Mao, Kaoshiung Hsien (TW);
Je-Ping Hu, Taipei Hsien (TW);
Chung-Fan Chiou, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 845 days.

(21) Appl. No.: 10/021,598

(22) Filed: Dec. 12, 2001

(65) Prior Publication Data
US 2003/0108451 A1 Jun. 12, 2003

(51) Int. Cl.
*B41J 2/175* (2006.01)
*B01L 3/02* (2006.01)

(52) U.S. Cl. ............................. 347/87; 347/86; 422/100

(58) Field of Classification Search ................ 347/6, 347/20, 40, 56, 68, 86–87; 73/863.32; 422/100, 422/102, 104; 435/286.4; 264/157
See application file for complete search history.

(56) References Cited

U.S. PATENT DOCUMENTS

| 4,005,440 | A | * | 1/1977 | Amberntsson et al. ........ 347/68 |
| 4,158,847 | A | * | 6/1979 | Heinzl et al. ................. 347/40 |
| 4,215,092 | A | * | 7/1980 | Suovaniemi et al. ..... 73/863.32 |
| 4,412,232 | A | * | 10/1983 | Weber et al. ................. 347/68 |
| 4,414,552 | A | * | 11/1983 | Bergmann et al. ........... 347/68 |
| 4,421,706 | A | * | 12/1983 | Feenstra et al. ............ 264/157 |
| 4,504,845 | A | * | 3/1985 | Kattner et al. ............... 347/68 |
| 4,548,825 | A | * | 10/1985 | Voss et al. .................. 426/383 |
| 4,623,904 | A | * | 11/1986 | Conta et al. ................. 347/68 |
| 5,047,790 | A | * | 9/1991 | Cowger et al. .............. 347/87 |
| 5,689,295 | A | * | 11/1997 | Eremin et al. ............... 347/43 |
| 6,001,309 | A | * | 12/1999 | Gamble et al. ............. 422/100 |
| 6,235,473 | B1 | * | 5/2001 | Friedman et al. ............. 435/6 |
| 6,394,598 | B1 | * | 5/2002 | Kaiser ........................ 347/109 |
| 6,866,825 | B1 | * | 3/2005 | Chiou et al. ................ 422/100 |

* cited by examiner

*Primary Examiner*—Anh T. N. Vo
(74) *Attorney, Agent, or Firm*—Darby & Darby (57) ABSTRACT

An inkjet cartridge for dispensing a predetermined amount of reagents is provided. The inkjet cartridge comprises an inkjet print head and an array of capillary tubes. The print head is provided with a plurality of channels. The capillary tubes, filled with predetermined reagents, are disposed on the inkjet print head so as to communicate with the channels respectively and provide capillarity sufficient to prevent the reagents in the capillary tubes from leaking through the channels but not so great as to prevent the reagents in the capillary tubes from dispensing through the channels.

20 Claims, 8 Drawing Sheets

MULTI-REAGENT INKJET CARTRIDGE

BACKGROUND OF THE INVENTION

1. Field of the Invention

The invention relates to an inkjet cartridge for dispensing a predetermined amount of fluids; in particular, the invention relates to an inkjet cartridge with capillary tubes arranged in a high-density array.

2. Description of the Related Art

Advances in industries employing chemical and biological processes have created a need for devices that accurately and automatically dispense small quantities of liquids containing chemically or biologically active substances for commercial or experimental use. Accuracy and precision in the amount of liquid dispensed are important both from the standpoint of causing a desired reaction and minimizing the amount of material used. An example of a device with an array of reagents disposed thereupon is a biochip.

Figure 1A:
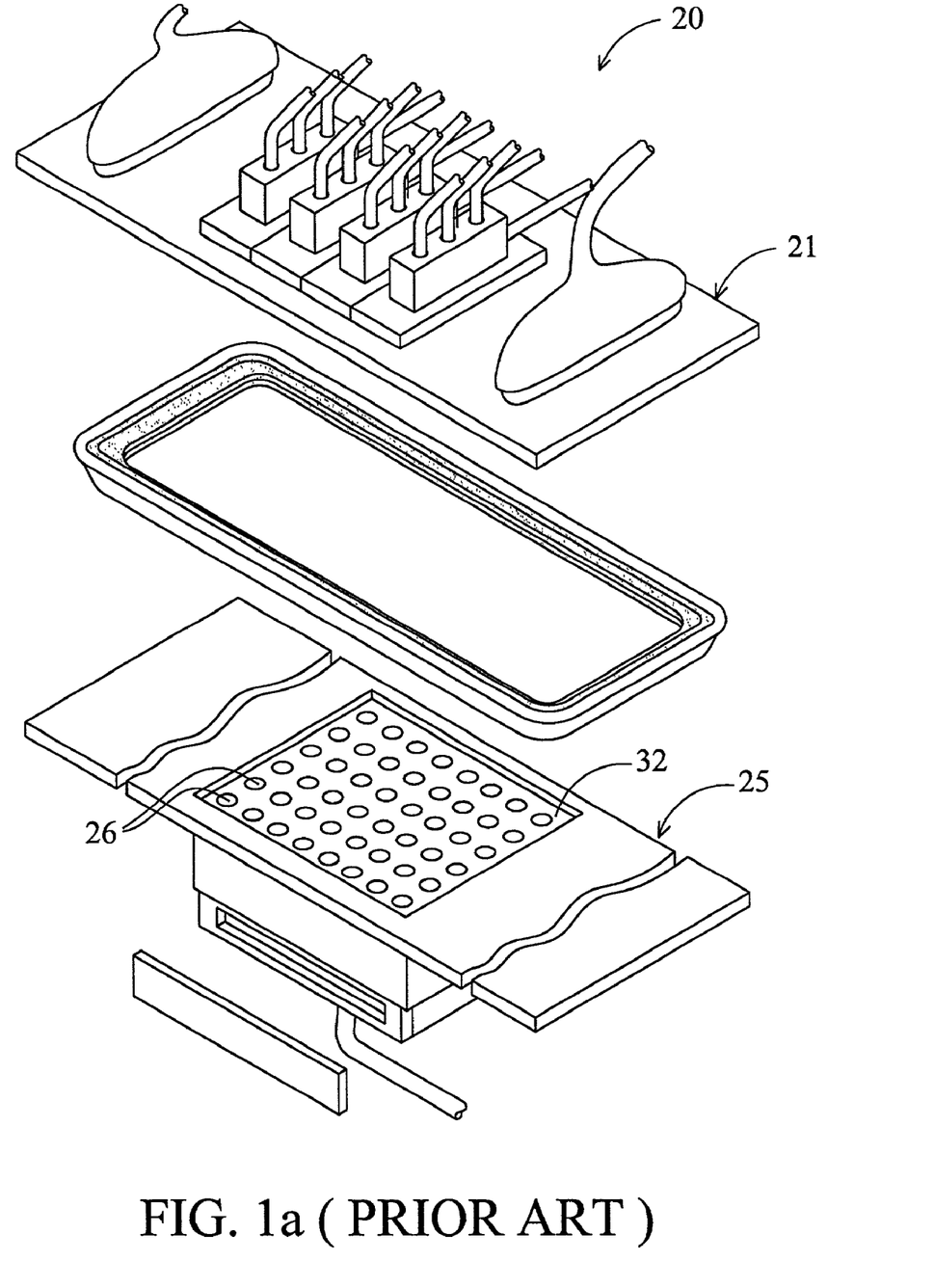
FIG. 1a is an exploded top perspective view of the conventional dispensing apparatus as disclosed in U.S. Pat. No. 6,001,309.
Figure 1B:
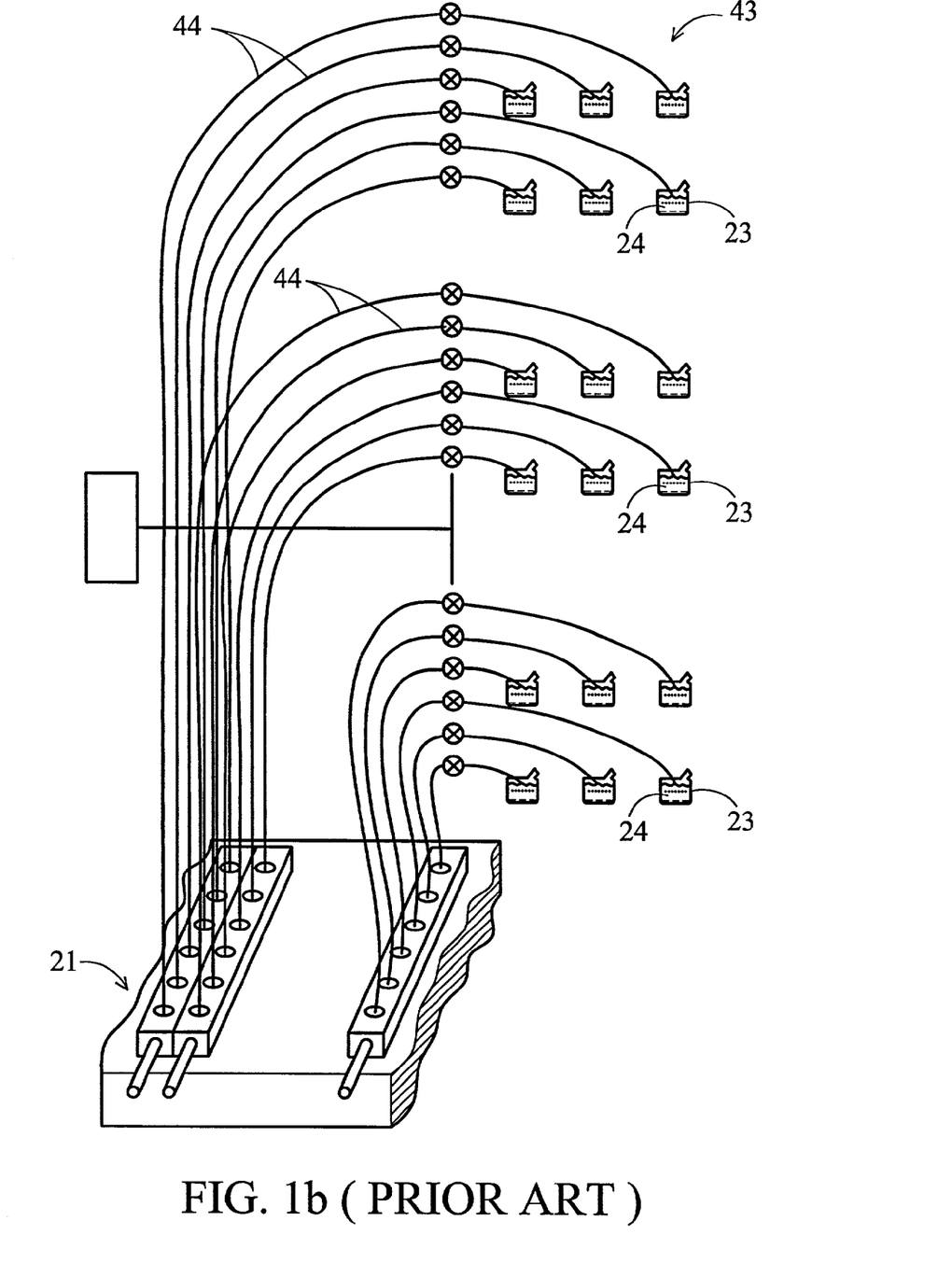

In FIG. 1a and FIG. 1b, a conventional apparatus for dispensing reagents disclosed in U.S. Pat. No. 6,001,309 is shown. FIG. 1a is an exploded top perspective view of the conventional dispensing apparatus. FIG. 1b is an enlarged, schematic, top perspective view of a setup of a nozzle delivery assembly of the conventional dispensing apparatus. Referring to FIG. 1a, the conventional dispensing apparatus 20 comprises a head assembly 21 having a plurality of nozzles (not shown). A base assembly 25 is provided with at least one reaction well 26 and a transport mechanism (not shown). An array of wells 26 is provided and formed in a microtiter plate 32. Referring to FIG. 1b, a delivery assembly 43 controls delivery of reagents 24 through nozzles to reservoirs 23. In the delivery assembly 43, the nozzles are coupled to reservoirs 23 by dispensing tubes 44.

However, such conventional dispensing apparatus is very complicated. Thus, its cost is expensive, and its assembly requires a large space.

Recently, inkjet printers have become established as reliable and efficient dispensing devices. However, there are two main concerns when applying the inkjet cartridges in the biological and chemical analysis. One is that the reagents the inkjet cartridge must be stored in a manner that provides a slight back pressure to the inkjet cartridge to prevent leakage from the inkjet cartridge when the inkjet cartridge is inactive. The other one is that the inkjet cartridge must avoid any intermixing of the different kinds of reagents.

Figure 2:
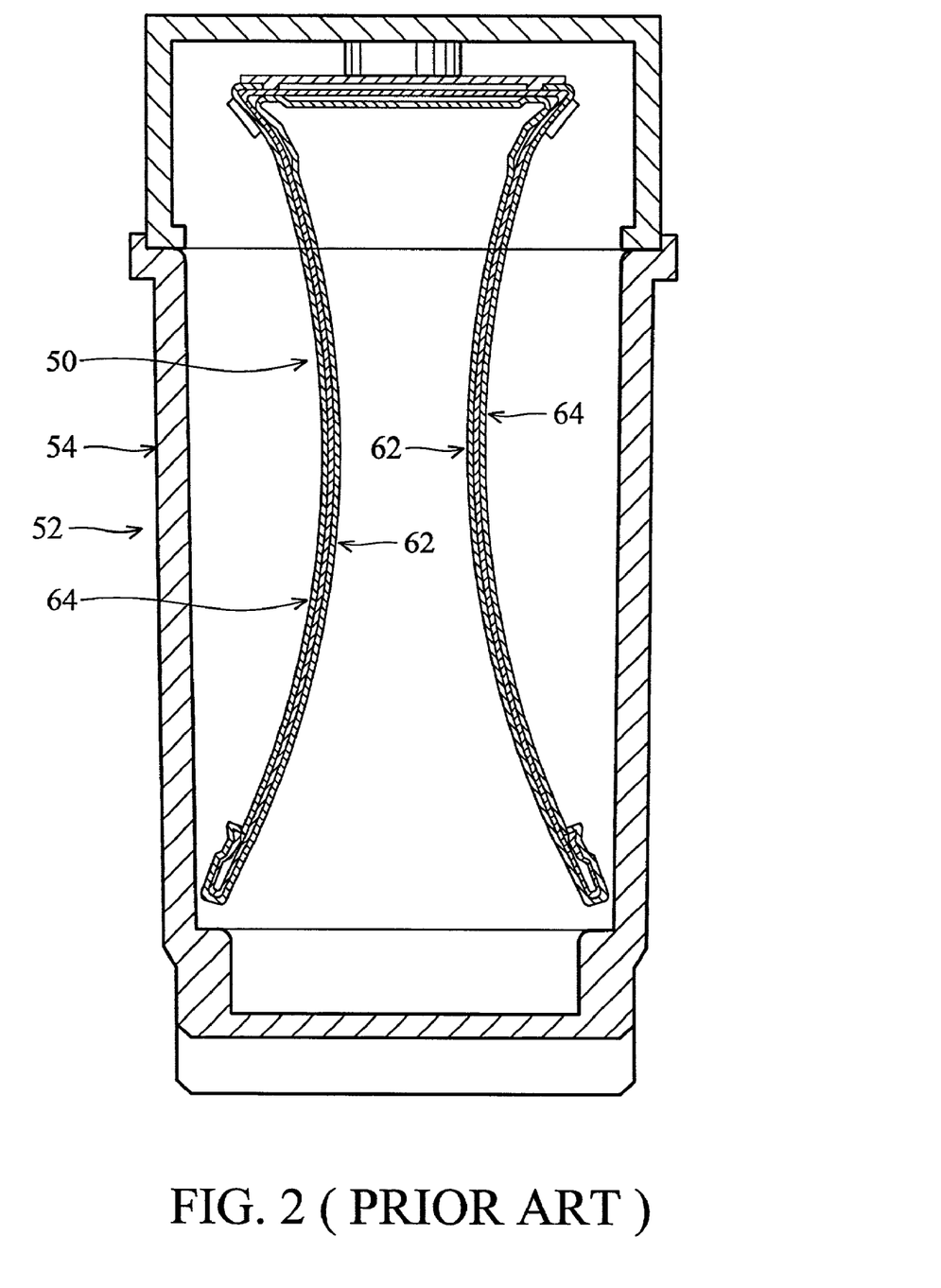
FIG. 2 shows a conventional inkjet cartridge that can adjust its back pressure and is disclosed in U.S. Pat. No. 5,505,339.

FIG. 2 shows a conventional inkjet cartridge that can adjust its back pressure and is disclosed in U.S. Pat. No. 5,505,339. An accumulator 50 is configured to fit into an inkjet cartridge 52 including a reservoir 54 that hold a quantity of ink. The accumulator 50 includes an expandable bag 62 that is mounted to a spring 64. With such structure, the inkjet cartridge can adjust its back pressure based on environmental changes. Other conventional inkjet cartridges that can adjust its back pressure are disclosed, in U.S. Pat. No. 5,526,030, U.S. Pat. No. 4,771,295, U.S. Pat. No. 5,047,790, U.S. Pat. No. 5,409,134, and U.S. Pat. No. 5,998,803.

However, conventional inkjet cartridges that can adjust their back pressure are very complicated in structure. In addition, after dispensing, the mount of the ink remaining in the inkjet cartridge is so large that it is difficult to deal with.

Figure 3A:
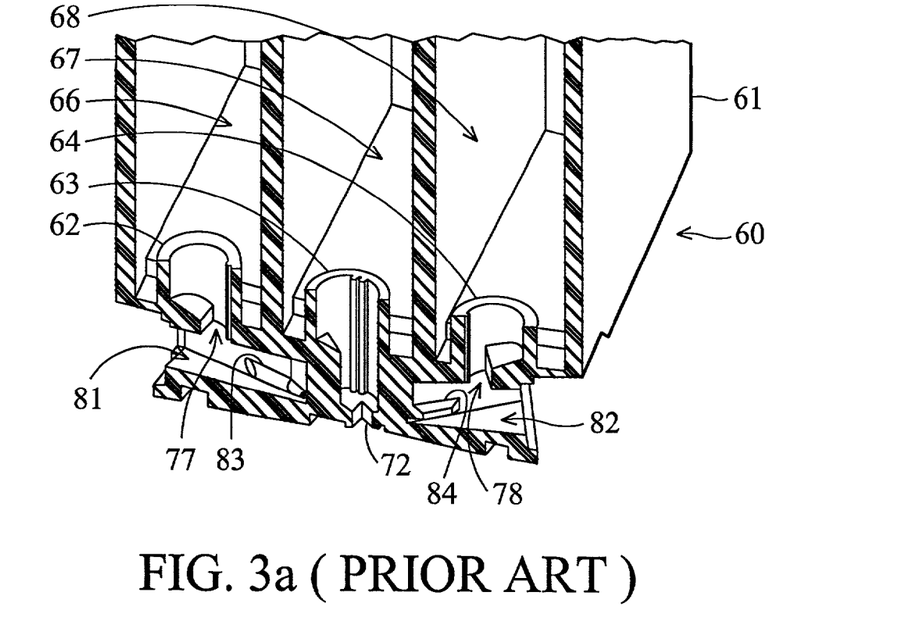
FIG. 3a is a perspective, sectional view of a print head body of the conventional inkjet cartridge as disclosed in U.S. Pat. No. 5,497,178.
Figure 3B:
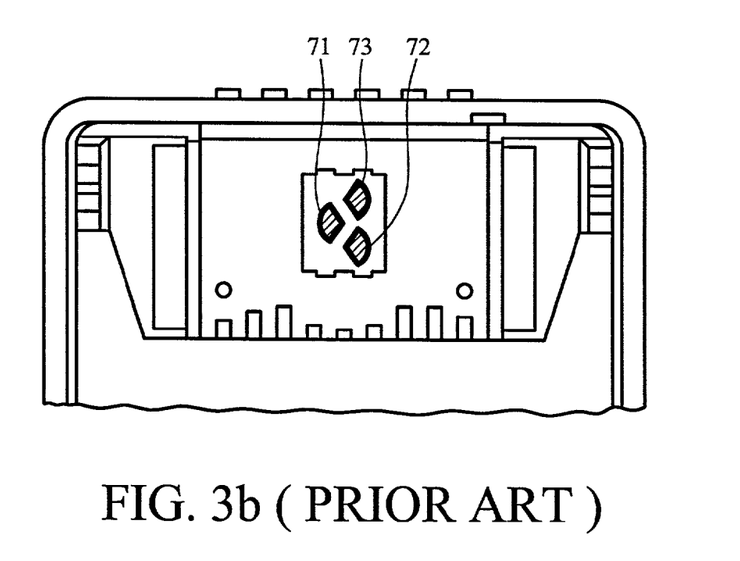

FIG. 3a and FIG. 3b shows a conventional inkjet cartridge that can avoid intermixing of the different kinds of inks, which is disclosed in U.S. Pat. No. 5,497,178. FIG. 3a is a perspective, sectional view of a print head body of the conventional inkjet cartridge as disclosed in U.S. Pat. No. 5,497,178, and FIG. 3b is a bottom view of the printer head body in FIG. 3a. A conventional inkjet cartridge 60 includes a print head body 61 containing three standpipe portions 62, 63, and 64. The standpipes 62, 63 and 64 are located in separate ink chambers 66, 67, 68, respectively. Exit ports 71, 72 and 73, as shown in FIG. 3b, communicate with the ink chambers 66, 67, 68, respectively. An opening 77 in the bottom of the standpipe 62 allows ink to flow downwardly into a crossflow channel 81. An opening 78 in the bottom of the standpipe 64 allows ink to flow downwardly into a crossflow channel 82. The crossflow channel 81 slopes downwardly and forwardly, terminating in a reduced cross-section portion 83 which in turn leads to the exit port 71. Similarly, the crossflow channel 82 slopes downwardly and forwardly, terminating in a reduced cross-section portion 84 which in turn leads to the exit port 73. With such structure, the inkjet cartridge can avoid intermixing of the different kinds of inks. Other conventional inkjet cartridges that can avoid intermixing of the different kinds of inks are disclosed, for example, in U.S. Pat. No. 5,659,345 and U.S. Pat. 5,831,653.

However, all of the conventional inkjet cartridges that can avoid intermixing of the different kinds of inks are very complicated in structure. In addition, it is difficult to apply conventional inkjet cartridges used in a dispensing device in which the amount of the dispensing fluid is very small.

SUMMARY OF THE INVENTION

In order to address the disadvantages of the aforementioned dispensing apparatus and inkjet cartridges, the invention provides an inkjet cartridge, provided with capillary tubes arranged in a high-density array, that can be applied in chemical and biological processes.

Another purpose of the invention is to provide an inkjet cartridge that can control its back pressure and avoid intermixing of the different kinds of reagents with a simplified structure.

Accordingly, the invention provides an inkjet cartridge for dispensing a predetermined amount of reagents. The inkjet cartridge comprises an inkjet print head and an array of capillary tubes. The print head is provided with a plurality of fluid channels. The capillary tubes, filled with predetermined reagents, are disposed on the inkjet print head so as to communicate with the fluid channels respectively and provide capillarity sufficient to prevent the reagents in the capillary tubes from leaking through the fluid channels, but not so great to prevent the reagents in the capillary tubes from dispensing through the fluid channels.

In a preferred embodiment, the inkjet print head comprises a base, an inkjet chip and a nozzle plate. The base, having a plurality of first through holes corresponding to the capillary tubes respectively, receives the capillary tubes. The inkjet chip, for actuating the reagents in the capillary tubes to dispense, is disposed on the base and provided with a plurality of second through holes corresponding to the first through holes respectively. The nozzle plate, for dispensing the reagents in the capillary tubes, is disposed on the inkjet chip and provided with a plurality of orifices corresponding to the second through holes respectively. The first through holes, the second through holes and the orifices form the fluid channels respectively.

Furthermore, the inkjet chip is adhered to the base, and the nozzle plate is adhered to the inkjet chip.

In a preferred embodiment, parts of the capillary tubes are filled with gel-like materials or oil-like materials above the received reagent so as to prevent the reagent from leaking.

In another preferred embodiment, a cap with a pressure regulator can be disposed on the top of the capillary tubes so that the capacity of the reagent in the capillary tube can be enlarged without causing leakage.

It is understood that the inkjet print head could be thermal bubble type or piezoelectric pressure wave type.

BRIEF DESCRIPTION OF THE DRAWINGS

The invention is hereinafter described in detail with reference to the accompanying drawings in which:

FIG. 1b is an enlarged, schematic, top perspective view of a setup of a nozzle delivery assembly of the conventional dispensing apparatus as shown in FIG. 1a;

FIG. 3b is a bottom view of FIG. 3a;

DETAILED DESCRIPTION OF THE INVENTION

Figure 4A:
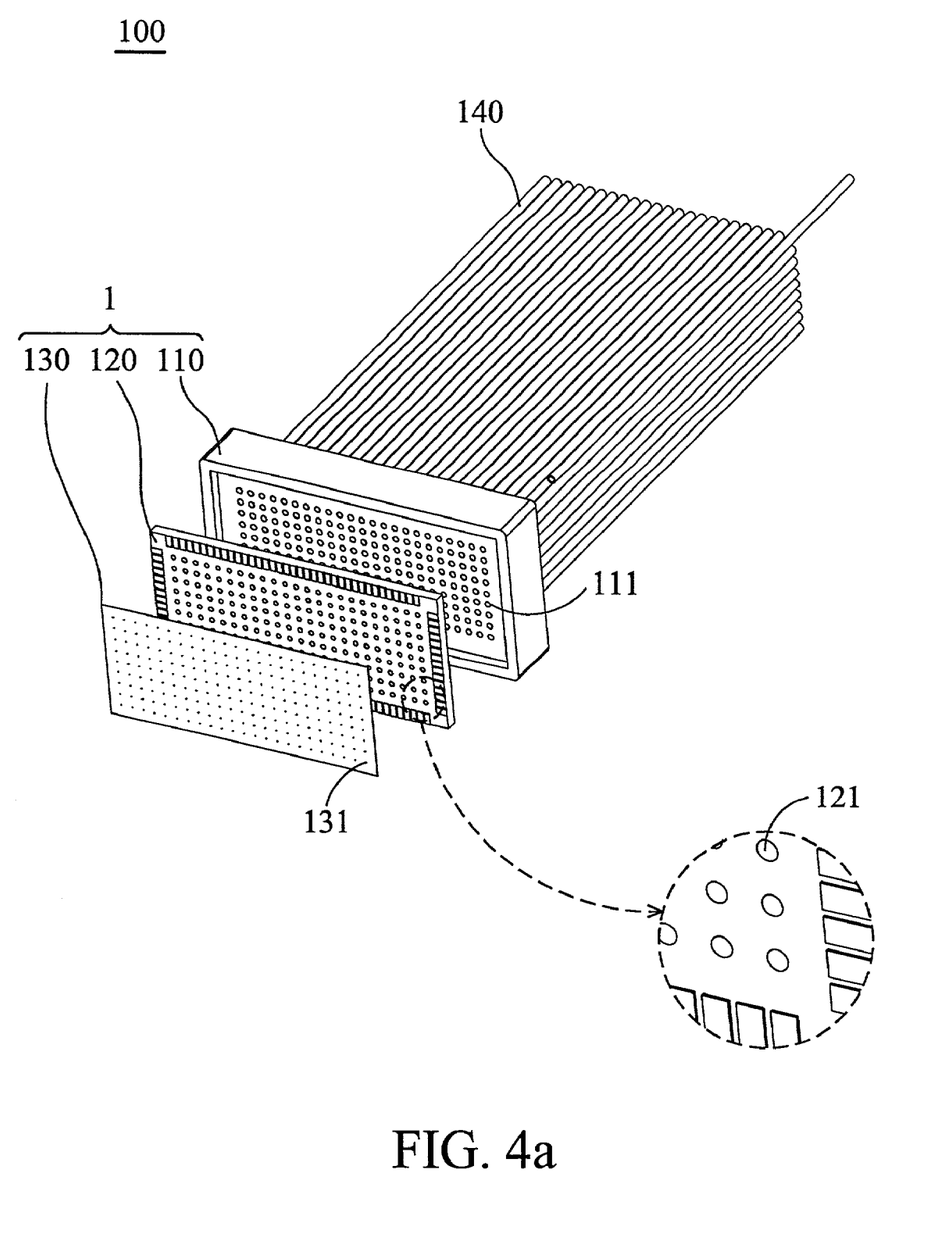
FIG. 4a is an exploded top perspective view of an inkjet cartridge as disclosed in this invention.
Figure 4B:
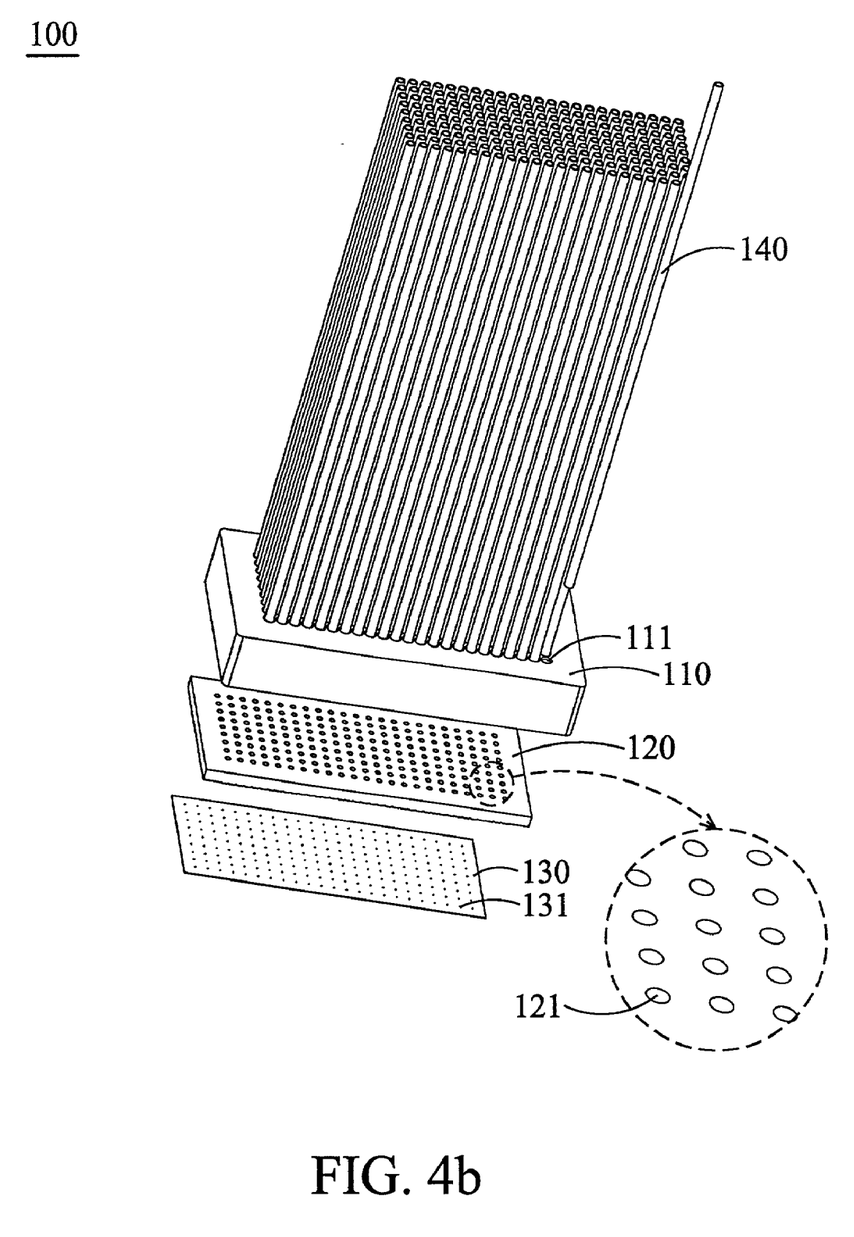
FIG. 4b is an exploded bottom perspective view of the inkjet cartridge as disclosed in this invention.
Figure 5:
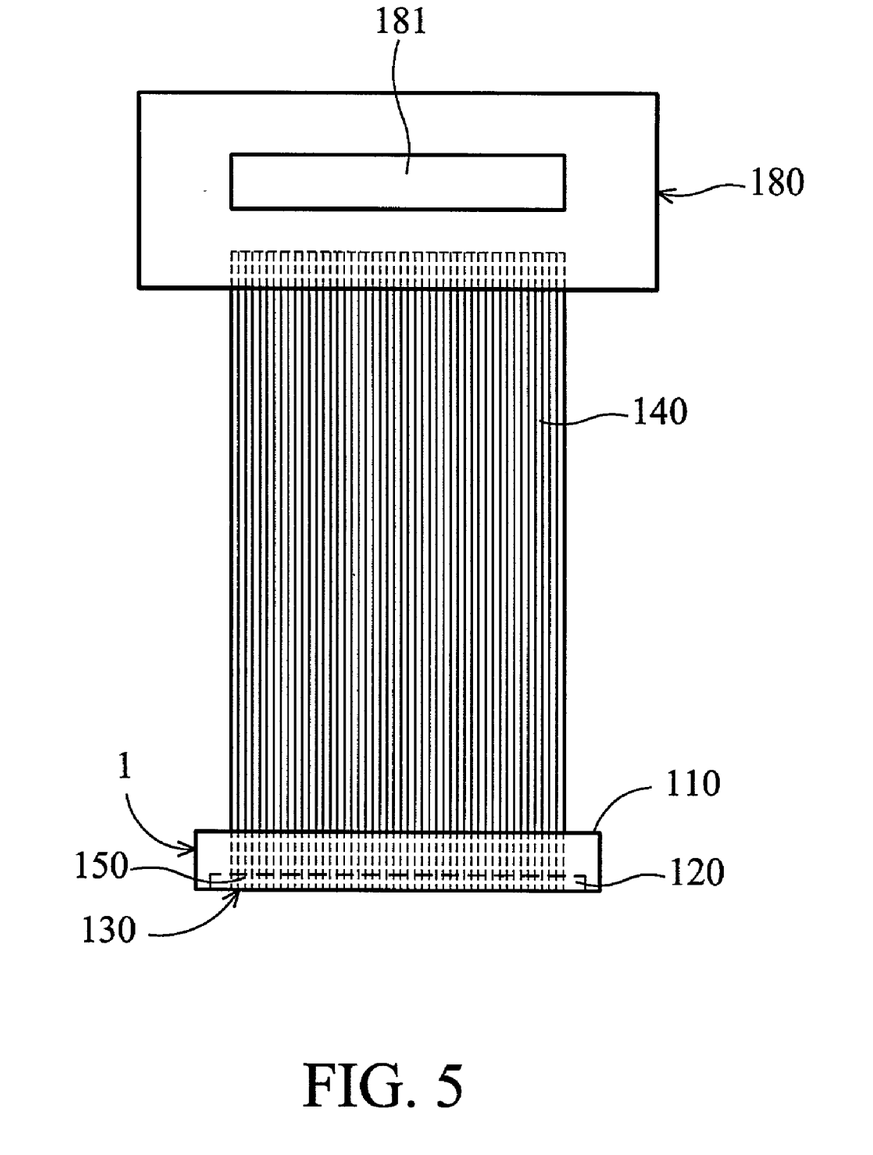
FIG. 5 is a front view of the inkjet cartridge as disclosed in this invention.

Referring to FIG. 4a and FIG. 4b and FIG. 5, an inkjet cartridge 100 as disclosed in this invention is shown. The inkjet cartridge 100 comprises an inkjet print head 1 and an array of capillary tubes 140.

The print head 1 is provided with a plurality of fluid channels 150, as shown in FIG. 5, includes a base 110, an inkjet chip 120 and a nozzle plate 130. The base 110 is provided with a plurality of first through holes 111 corresponding to the capillary tubes 140 and receiving the capillary tubes 140 respectively. The inkjet chip 120, for actuating fluids 160 in the capillary tubes 140 to dispense, is disposed on the base 110 and provided with a plurality of second through holes 121 corresponding to the first through holes 111 respectively. The nozzle plate 130, for dispensing the fluids 160 in the capillary tubes 140, is disposed on the inkjet chip 120 and provided with a plurality of orifices 131 corresponding to the second holes 121 respectively. Furthermore, the first through holes 111, the second through holes 121 and the orifices 131 form the fluid channels 150 respectively, as shown in FIG. 5.

Furthermore, the inkjet chip 120 may be adhered to the base 110, and the nozzle plate 130 may be adhered to the inkjet chip 120.

Figure 4C:
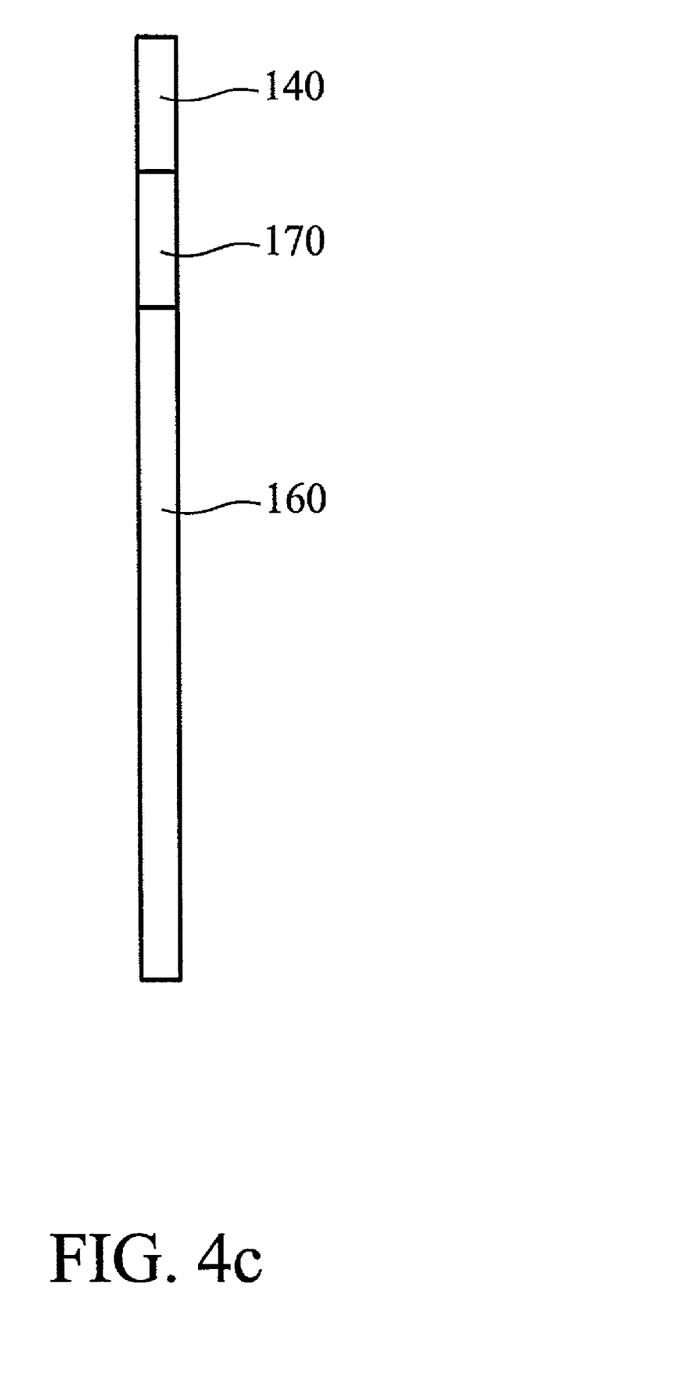
FIG. 4c is a schematic view depicting a fluid and a material inside a capillary tube.

As shown in FIG. 4c, each of the capillary tubes 140 is filled with predetermined fluid 160. Referring to FIG. 5, each of the capillary tubes 140 is disposed on the base 110 of the inkjet print head 1 so as to communicate with the fluid channels 150 respectively. It is noted that each of the capillary tubes 140 provides capillarity sufficient to prevent the fluids 160 in the capillary tubes 140 from leaking through the channel 150 but not so great as to prevent the fluids 160 in the capillary tubes 140 from dispensing through the channel 150. That is, the back pressure of the fluid 160 in the capillary tubes 140 can be controlled by the capillarity of the capillary tubes 140.

In addition, for enlarging the capacity of the fluid 160 in the capillary tubes 140 without leakage, a cap 180 with a pressure regulator 181 is disposed on the top of the capillary tubes 140. By means of the pressure regulator 181, the pressure in the capillary tubes 140 can be properly controlled so that the capacity of the fluid 160 in the capillary tube 140 can be enlarged without causing leakage.

It is understood that the fluid 160 can be a reagent during a biological or chemical analysis. After the fluid 160 received in the predetermined capillary tubes 140 runs out, the same kind of fluid 160 can be refilled into the capillary tubes 140, or the whole capillary tubes 140 can be replaced with a new capillary tubes 140 having the same kind of fluid 160.

Also, it is understood that the inkjet print head 1 could be thermal bubble type or piezoelectric pressure wave type. Since the dispensing mechanism inside the inkjet print head 1 is the same as the conventional device, the detail description about dispensing the fluid 160 from the capillary tube 140 through the inkjet print head 1 is omitted.

In addition, as shown in FIG. 4c, each of the capillary tubes 140 can be filled with gel-like materials or oil-like materials 170 above the received fluid 160 so as to prevent the fluid 160 from leaking at the filling end.

The inkjet cartridge 100, as disclosed in this invention, has the following advantages:

1. Since the back pressure of the fluid 160 in the capillary tube 140 can be controlled by the capillarity of the capillary tube 140, the whole structure of the inkjet cartridge 100 is simpler than that of the conventional device.

2. Since the fluid 160 is received in the capillary tube 140, the amount of the fluid 160 can be very small. Thus, the inkjet cartridge 100 of this invention can be adapted to a device for dispensing small amount fluid.

3. Since the capillary tube is applied in the inkjet cartridge of this invention, the amount of the fluid remaining in the inkjet cartridge after dispensing is less.

4. Since each of the orifices of the nozzle plate corresponds to a capillary tube, the size of the orifices is very small. Thus, such arrangement of the orifices can avoid intermixing of the different kinds of fluids.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An inkjet cartridge for dispensing a predetermined amount of fluids comprising:

an inkjet print head having a plurality of fluid channels; and a plurality of capillary tubes having a uniform diameter, filled with predetermined fluids, disposed on the inkjet print head so as to communicate with the fluid channels respectively and provide capillarity sufficient to prevent the fluids in the capillary tubes from leaking through the fluid channels but not so great as to prevent the fluids in the capillary tubes from dispensing through the fluid channels;

wherein the capillary tubes do not communicate with each other.

2. The inkjet cartridge as claimed in claim 1, wherein the inkjet print head comprises:
- a base, having a plurality of first through holes corresponding to the capillary tubes respectively, for receiving the capillary tubes;
- an inkjet chip, for actuating the fluids in the capillary tubes to dispense, disposed on the base and provided with a plurality of second through holes corresponding to the first through holes respectively; and
- a nozzle plate, for dispensing the fluids in the capillary tubes, disposed on the inkjet chip and provided with a plurality of orifices corresponding to the second through holes respectively, wherein the first through holes, the second through holes and the orifices form the fluid channels respectively.

3. The inkjet cartridge as claimed in claim 2, wherein the inkjet chip is adhered to the base.

4. The inkjet cartridge as claimed in claim 2, wherein the nozzle plate is adhered to the inkjet et chip.

5. The inkjet cartridge as claimed in claim 1, wherein parts of the capillary tubes are filled with gel-like materials above the received fluid so as to prevent the fluid from leaking.

6. The inkjet cartridge as claimed in claim 1, wherein parts of the capillary tubes is filled with oil-like materials above the received fluid so as to prevent the fluid from leaking.

7. The inkjet cartridge as claimed in claim 1, wherein the inkjet print head is thermal bubble type.

8. The inkjet cartridge as claimed in claim 1, wherein the inkjet print head is piezoelectric pressure wave type.

9. The inkjet cartridge as claimed in claim 1, further comprising:
- a cap, with a pressure regulator, disposed on the capillary tubes so that the capacity of the fluid in the capillary tubes can be enlarged without causing leakage.

10. The inkjet cartridge as claimed in claim 1, wherein the capillary tubes are disposed on the inkjet print head in an array manner.

11. A cartridge for dispensing a predetermined amount of reagents comprising:
- a print head having a plurality of fluid channels; and
- a plurality of capillary tubes having a uniform diameter, filled with predetermined reagents, disposed on the print head so as to communicate with the fluid channels respectively and provide capillarity sufficient to prevent the reagents in the capillary tubes from leaking through the fluid channels but not so great as to prevent the reagents in the capillary tubes from dispensing through the fluid channels;

wherein the capillary tubes do not communicate with each other.

12. The cartridge as claimed in claim 11, wherein the print head comprises:
- a base, having a plurality of first through holes corresponding to the capillary tubes respectively, for receiving the capillary tubes;
- an inkjet chip, for actuating the reagents in the capillary tubes to dispense, disposed on the base and provided with a plurality of second through holes corresponding to the first through holes respectively; and
- a nozzle plate, for dispensing the reagents in the capillary tubes, disposed on the inkjet chip and provided with a plurality of orifices corresponding to the second through holes respectively, wherein the first through holes, the second through holes and the orifices form the fluid channels respectively.

13. The cartridge as claimed in claim 12, wherein the inkjet chip is adhered to the base.

14. The cartridge as claimed in claim 12, wherein the nozzle plate is adhered to the inkjet et chip.

15. The cartridge as claimed in claim 11, wherein parts of the capillary tubes are filled with gel-like materials above the received reagent so as to prevent the reagent from leaking.

16. The cartridge as claimed in claim 11, wherein parts of the capillary tubes are filled with oil-like materials above the received reagent so as to prevent the reagent from leaking.

17. The cartridge as claimed in claim 11, wherein the print head is thermal bubble type.

18. The cartridge as claimed in claim 11, wherein the print head is piezoelectric pressure wave type.

19. The cartridge as claimed in claim 11, further comprising:
- a cap, with a pressure regulator, disposed on the capillary tubes so that the capacity of the fluid in the capillary tubes can be enlarged without causing leakage.

20. The cartridge as claimed in claim 11, wherein the capillary tubes are disposed on the print head in an array manner.

* * * * *